INVENTORS
R. C. PITETTI
T. W. ZUBER, JR.

BY

ATTORNEY

United States Patent Office 3,649,488
Patented Mar. 14, 1972

3,649,488
ELECTROCHEMICAL ETCHING TECHNIQUE FOR CHARTING AND CURING DEFECTS IN THIN FILM CAPACITORS
Raymond C. Pitetti, Wescosville, and Theodore W. Zuber, Jr., Allentown, Pa., assignors to Bell Telephone Laboratories, Incorporated, Murray Hill and Berkeley Heights, N.J.
Filed Nov. 7, 1969, Ser. No. 874,912
Int. Cl. B23p 1/00
U.S. Cl. 204—143 R        8 Claims

ABSTRACT OF THE DISCLOSURE

Defects in planar capacitors may be charted and cured by electrolytic etching of localized regions of capacitor counterelectrodes above high conductivity paths through the dielectric.

FIELD OF THE INVENTION

This invention relates to a technique for selectively charting defects in planar capacitor structures and curing same.

DESCRIPTION OF THE PRIOR ART

In recent years there has been widespread interest in the electronics industry in a class of capacitors commonly referred to as printed capacitors. These structures are typically constructed by depositing a layer of a film-forming metal, for example, tantalum, aluminum, niobium, titanium, etc., upon a substrate, anodizing the deposited layer to form an oxide film and finally depositing a counterelectrode in direct contact with the anodized film. The resultant device was found to be polar in nature and represented the first such device in which a semiconductive layer of manganese dioxide was eliminated, such having been a requirement in solid electrolytic capacitors prepared theretofore.

Initially, it was believed that the printed capacitor represented the ultimate objective in the development of capacitors employing an electrode comprising a film-forming metal. Although this type of device has proven to be eminently suited for use in printed circuitry, its importance in this use has resulted in a continuing effort to improve its characteristics. Accordingly, workers in the art have incessantly sought to develop techniques for minimizing the presence of defects or irregularities in the anodized dielectric film.

One technique for attaining this end which is described in detail in U.S. Pat. 3,079,536, granted to D. A. McLean on Feb. 26, 1963, involved contacting the anodized electrode with a non-aqueous electrolyte containing a low concentration of one or more halide ions, biasing the electrode positively for a short period of time, reanodizing the electrode and depositing a counterelectrode thereon. The net result of such treatment was found to be a decrease in the leakage current and a consequent increase in the yield of capacitors meeting the required leakage current standards.

The utility of such technique and the refinements thereof have been conclusively demonstrated in higher initial yields as well as in a decided improvement in life test performance.

Despite these improvements and the impressive initial conversion of shorted capacitors to acceptable capacitors, such dielectric oxide films were found not to be completely amenable to processing in accordance with the described etching technique. The importance of being able to cure all defects is critical in integrated multiple capacitor circuits which require high yields, so accounting for the continued interest in this area of endeavor.

Another technique directed to this end, which is described in detail in U.S. Pat. 3,407,465, granted on Oct. 29, 1968 to W. C. G. Ortel, involves charting defects in thin film capacitors by means of the thermal Marangoni effect, and, subsequently, etching away the counterelectrode at the sites of highly conductive faults. More specifically, this technique involves coating the counterelectrode of the capacitor of interest with a thin layer of fluid in which a surface tension gradient is introduced by the application of a difference of potential between the electrodes of the device, thereby generating voids at defective sites in the coating. Thereafter, conventional etching techniques are utilized to remove the counterelectrode at defective sites.

Although this procedure attained a certain measure of success, it has been found that it is not effective in the repair of certain thin film capacitors bearing Nichrome-gold counter electrodes. Accordingly, the interest of workers in the art was focused upon this particular problem.

SUMMARY OF THE INVENTION

In accordance with the present invention the prior art problems are effectively obviated by a novel technique wherein electrochemical etching is employed to selectively etch localized regions of the counterelectrode above high conductivity paths through the dielectric, thereby resulting in the fabrication of a defect-free structure. Briefly, the inventive technique involves isolating a thin film capacitor structure by conventional techniques and submerging the structure in an electrolyte in which is disposed a suitable inert electrode. Thereafter, a difference of potential is impressed across the inner electrode and the conductive or base layer of the capacitor, etching occurring in those areas of the electrode above high conductivity paths.

BRIEF DESCRIPTION OF THE DRAWING

The invention will be more readily understood by reference to the following detailed description taken in conjunction with the accompanying drawing, wherein.

DETAILED DESCRIPTION

Figure 1:
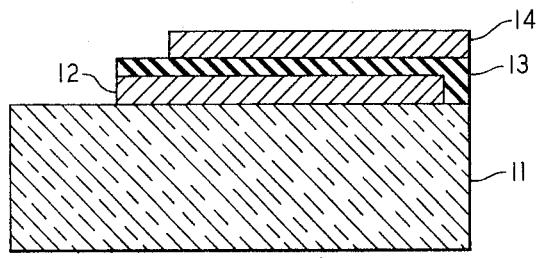
FIG. 1 is a cross-sectional view of a typical printed capacitor employed in the practice of the present invention.

With further reference now to FIG. 1, there is shown a substrate 11 upon which a layer of a film-forming metal 12 has been deposited, typically by condensation techniques such as vacuum evaporation or cathodic sputtering, as described in detail in U.S. Pat. 2,993,266, issued on July 25, 1961 to R. W. Berry. Dielectric oxide film 13 is shown deposited upon and in intimate contact with oxide layer 13.

It will be understood by those skilled in the art that devices of the type shown in FIG. 1 are amenable to processing in accordance with the present invention and that the particular technique utilized in fabricating such structures is of no criticality. Thus, it will be appreciated that any convenient procedure for deposition and anodization of the film-forming metal and deposition of the counterelectrode may be employed. Similarly, the film-forming metals, counterelectrode and electrolytes may be selected from among materials commercially available.

The first step in the practice of the present invention involves constructing a suitable dam, typically comprising grease or beeswax about the surface of the counterelectrode for the purpose of confining the electrolyte chosen for etching the counterelectrode at defective sites. In the alternative, a gel such as carboxy methyl cellulose presoaked in the etchant of interest may be employed.

Following, the counterelectrode is contacted with an electrolyte capable of etching it electrochemically and an inert electrode inserted in the electrolyte. The electrolyte selected may be any composition known in the art to be capable of etching the counterelectrode of the capacitor of interest. An electrolyte found to be of particular interest for this purpose is a mixture of sulfuric and phosphoric acids. The electrode material employed similarly may be any conductive material known by those skilled in the art to be inert to the particular etchant selected. A material found to be eminently suited for this purpose is lead.

Next, an electrical circuit is completed by connecting the inert electrode to the negative side of a variable direct current power supply, the positive side of which is connected to the base electrode of the capacitor. In an alternative embodiment the power supply may also comprise a pulsed current source rather than the direct current source, the former being capable of producing repeated transient currents concentrated in the defect areas, thereby promoting etching in such areas while simultaneously limiting the time average current is available for etching at non-defective areas of the counterelectrode.

Upon the application of the voltage of the system, current flows through any defective sites in the counterelectrode which may be considered to be essentially point sources of current with relation to the counterelectrode. Thus, there initially exists a higher current density in the counterelectrode area immediately above the defect sites than exists elsewhere, so resulting in enhanced dissolution or etching at such locations. Additionally, the flow of current through the defect sites causes localized Joule heating which also contributes to the selective etching purposes.

Studies have revealed that the difference of potential impressed across the electrodes of the system should evidence a current within the range of 1 to 15 milliamperes. It will be appreciated by those skilled in the art that the use of currents in excess of 15 milliamperes result in the destruction of the counterelectrode and although such end is desirable at defect sites, practical considerations militate against this application. The lower limit of 1 milliampere is dictated by considerations relating to the minimum current required to enhance localized etching in a reasonable time.

Figure 2:
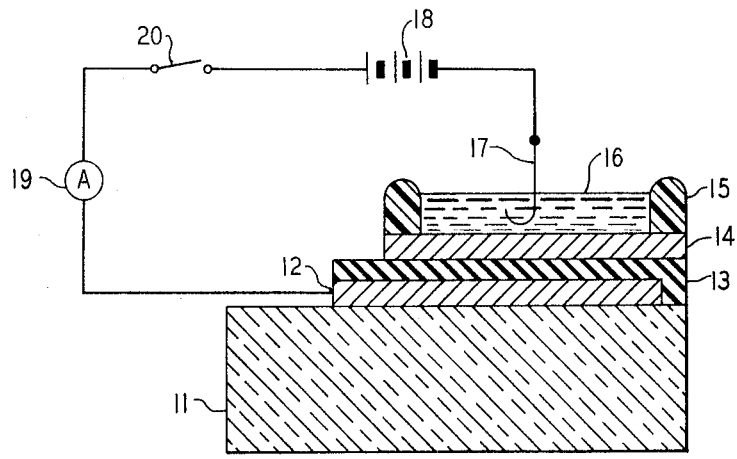
FIG. 2 is a front elevational view in cross-section of a capacitor being etched in accordance with the present invention.

With reference now to FIG. 2, there is shown a front elevational view in cross-section of a capacitor about to be etched in accordance with the present invention. Shown in FIG. 2 is a capacitor of the type shown in FIG. 1 (similar numerical designations referring to similar components) upon which walls 15 of a dam have been constructed on the counterelectrode surface. Electrolyte 16 is contained by dam walls 15 and has inserted therein an inert electrode 17. The electrical circuit connecting electrode 17 includes variable direct current power supply 18 and ammeter 19 disposed as shown. Etching of layer 14 is initiated by closing switch 20 and applying a low D-C voltage between electrode 17 and base electrode 12. During the etching process, gas is evolved through the etchant and upon conclusion or healing of the defective sites, a sudden decrease in current is observed on ammeter 19, so indicating that the process should be terminated by opening switch 20.

The present invention will be most fully understood by reference to the following exemplary embodiments.

Example I

Three 1" x 3" glass microscope slides containing 15 capacitors, each comprising beta tantalum anodized to 200 volts and including Nichrome-gold counterelectrodes (200 A. Nichrome-4000 A. gold) were each arranged in a configuration similar to that shown in FIG. 2 employing grease dams covered with a 50 percent sulfuric acid-50 percent phosphoric acid etchant into which a lead electrode was inserted. The electrical circuit was completed by connecting the lead electrode to the negative side of a direct current power supply and the tantalum base electrode to the positive terminal of the power supply. Thereafter, the power supply was set to deliver a maximum current of 1 milliampere to 50 volts maximum. Upon initial application of power, the power supply voltage dropped to less than 1 volt at a current of 1 milliampere and only 0.25 volt was sustained across the capacitor. Gas evolved through the acid electrolyte during the course of the etching process which lasted for 4 minutes. At the conclusion of this period, a sudden increase in voltage to 50 volts across the capacitor and a corresponding decrease in current to 0.03 milliampere was observed. The capacitor was then removed from the etching configuration and tested. It was determined that the first capacitor etched was no longer shorted and exhibited a capacitance reading within 2 percent of its normal value and a 50 volt D-C leakage current of 2 nanoamperes. The remaining 14 capacitors were successfully healed in the same manner and upon subsequent testing exhibited 50 volts D-C leakage currents ranging from 1 to 10 nanoamperes.

Example II

The procedure described in Example I was repeated utilizing 35 slides having approximately 525 capacitors of which 50 shorted initially. However, the power source utilized in this example was a pulse generator rather than a D-C power supply. A voltage pulse within the range of 1 to 2 volts at 1 kilohertz from the pulse generator was applied across the capacitor being treated in the anodic direction, voltage and current waveforms being observed as a function of time using a dual beam oscilloscope. In the case of normal, non-shorted capacitors, light current was drawn and a square wave was observed across the capacitor. Significant current was drawn upon the initial application of a pulse to a shorted capacitor and a distorted waveform was observed. Healing occurred within 1 to 2 minutes for currents limited to 3 milliamperes or less, as indicated by the appearance of a normal square wave across a given capacitor. After a capacitor had been healed, as indicated by the appearance of a square wave, the pulse generator voltage was raised to 40 volts. The average 40 volt D-C leakage current of the capacitors after healing was 3 nanoamperes, as compared with an average value of 0.5 nanoampere for non-shorted capacitors of the same group. The healed capacitors evidenced a capacitance within 3 percent of the normal value.

What is claimed is:

1. A method for eliminating internal short circuits in a thin film capacitor including successively a substrate member, a layer of a conductor, a layer of a dielectric material and a counterelectrode which comprises the steps of (a) placing an electrolytic etchant upon the counterelectrode, (b) immersing an inert electrode in the etchant, and (c) impressing a difference of potential between said inert electrode and said conductor, so resulting in etching of the counterelectrode directly above defect sites.

2. A method in accordance with the procedure of claim 1 wherein said etchant is placed upon the counterelectrode by confining an electrolyte within a dam.

3. A method in accordance with claim 1 wherein said etchant is placed upon said counterelectrode by placing a gel presoaked in an etchant upon the counterelectrode.

4. A method in accordance with the procedure of claim 1 wherein said power source is a direct current source.

5. A method in accordance with claim 1 wherein said power source is a pulsed current source.

6. A method in accordance with claim 1 wherein said electrolyte is a mixture of sulfuric acid and phosphoric acid.

7. A method in accordance with claim 1 wherein said inert electrode is lead, and said conductor is beta tantalum.

8. A method in accordance with claim 7 wherein said electrolyte is a mixture of phosphoric and sulfuric acids.

References Cited

UNITED STATES PATENTS

| | | | |
|---|---|---|---|
| 3,518,131 | 6/1970 | Glendinning | 204—143 R |
| 3,073,943 | 1/1963 | Girling et al. | 204—143 R |
| 3,079,536 | 2/1963 | McLean | 204—143 R |
| 3,506,506 | 4/1970 | Pennebaker, Jr. | 156—3 |

JOHN H. MACK, Primary Examiner

N. A. KAPLAN, Assistant Examiner

U.S. Cl. X.R.

29—25.42; 317—242; 324—60